(12) United States Patent
Anderson

(10) Patent No.: US 7,911,074 B2
(45) Date of Patent: Mar. 22, 2011

(54) TAPERED HELICAL AUGER TURBINE TO CONVERT HYDROKINETIC ENERGY INTO ELECTRICAL ENERGY

(76) Inventor: Winfield Scott Anderson, Palm Beach Gardens, FL (US)

( * ) Notice: Subject to any disclaimer, the term of this patent is extended or adjusted under 35 U.S.C. 154(b) by 0 days.

(21) Appl. No.: 12/640,855

(22) Filed: Dec. 17, 2009

(65) Prior Publication Data

US 2010/0127499 A1    May 27, 2010

Related U.S. Application Data

(62) Division of application No. 12/400,617, filed on Mar. 9, 2009, now Pat. No. 7,728,454.

(60) Provisional application No. 61/116,540, filed on Nov. 20, 2008.

(51) Int. Cl.
*F03B 13/12*    (2006.01)

(52) U.S. Cl. ............................................. 290/54; 290/43

(58) Field of Classification Search .................... 290/42, 290/43, 44, 53, 54, 55; 416/176
See application file for complete search history.

(56) References Cited

U.S. PATENT DOCUMENTS

| | | | |
|---|---|---|---|
| 102,276 A * | 4/1870 | Kinzler | |
| 1,371,610 A * | 3/1921 | Dungan | |
| 2,154,397 A | 4/1939 | Cook | |
| 3,818,703 A | 6/1974 | Lapeyre | |
| 3,818,704 A | 6/1974 | Lapeyre | |
| 3,918,838 A * | 11/1975 | Moody, Jr. et al. | |
| 4,151,424 A | 4/1979 | Bailey | |
| 4,384,212 A | 5/1983 | Lapeyre | |
| 4,412,417 A | 11/1983 | Dementhon | |
| 4,443,708 A | 4/1984 | Lapeyre | |
| 4,465,941 A | 8/1984 | Wilson et al. | |
| 4,500,259 A | 2/1985 | Schumacher | |
| 4,524,285 A | 6/1985 | Rauch | |
| 4,708,592 A * | 11/1987 | Krolick et al. | ................. 416/176 |
| 4,717,832 A * | 1/1988 | Harris | ............................ 290/43 |
| 4,849,647 A | 7/1989 | McKenzie | |
| 5,451,137 A | 9/1995 | Gorlov | |
| 5,642,984 A | 7/1997 | Gorlov | |
| 6,036,443 A | 3/2000 | Gorlov | |
| 6,135,729 A * | 10/2000 | Aber | ............................ 417/420 |
| 6,357,997 B1 * | 3/2002 | Rosefsky | |
| 6,626,638 B2 * | 9/2003 | Rosefsky | ....................... 415/4.3 |

(Continued)

FOREIGN PATENT DOCUMENTS

| | | |
|---|---|---|
| WO | 2006/059094 A1 | 6/2006 |
| WO | 2006/108421 A1 | 10/2006 |

*Primary Examiner* — Nicholas Ponomarenko
(74) *Attorney, Agent, or Firm* — Akerman Senterfitt

(57) ABSTRACT

A helical auger turbine and hydrokinetic device for use with electrical generators for producing electricity. The auger turbine includes a generally helical turbine blade rotatably mounted on a central shaft, which may be tapered at each end, and a flange extending perpendicularly to an edge of the turbine blade. At least one turbine blade support connection is included for connecting the central shaft to a support structure. An electrical generator may be powered by the helical auger turbine, that can be used in a tidal water flow. The helical auger turbine can operate a high pressure pump connected to a hydraulic accumulator for storing pressurized hydraulic fluid from the high pressure pump. An electrical generator can be operated by hydraulic fluid delivered from the hydraulic accumulator at times of slow water flow. A plurality of helical auger turbines can be horizontally oriented under water, tethered to legs of an ocean platform such as an oil rig secured to the seabed.

13 Claims, 10 Drawing Sheets

U.S. PATENT DOCUMENTS

| | | |
|---|---|---|
| 7,044,711 B2 | 5/2006 | Duncan, Jr. |
| 7,063,579 B2 | 6/2006 | Voves |
| 7,084,521 B1 | 8/2006 | Martin |
| 7,633,174 B1 * | 12/2009 | Feiler ............................... 290/43 |
| 7,728,454 B1 * | 6/2010 | Anderson, Jr. .................. 290/54 |

* cited by examiner

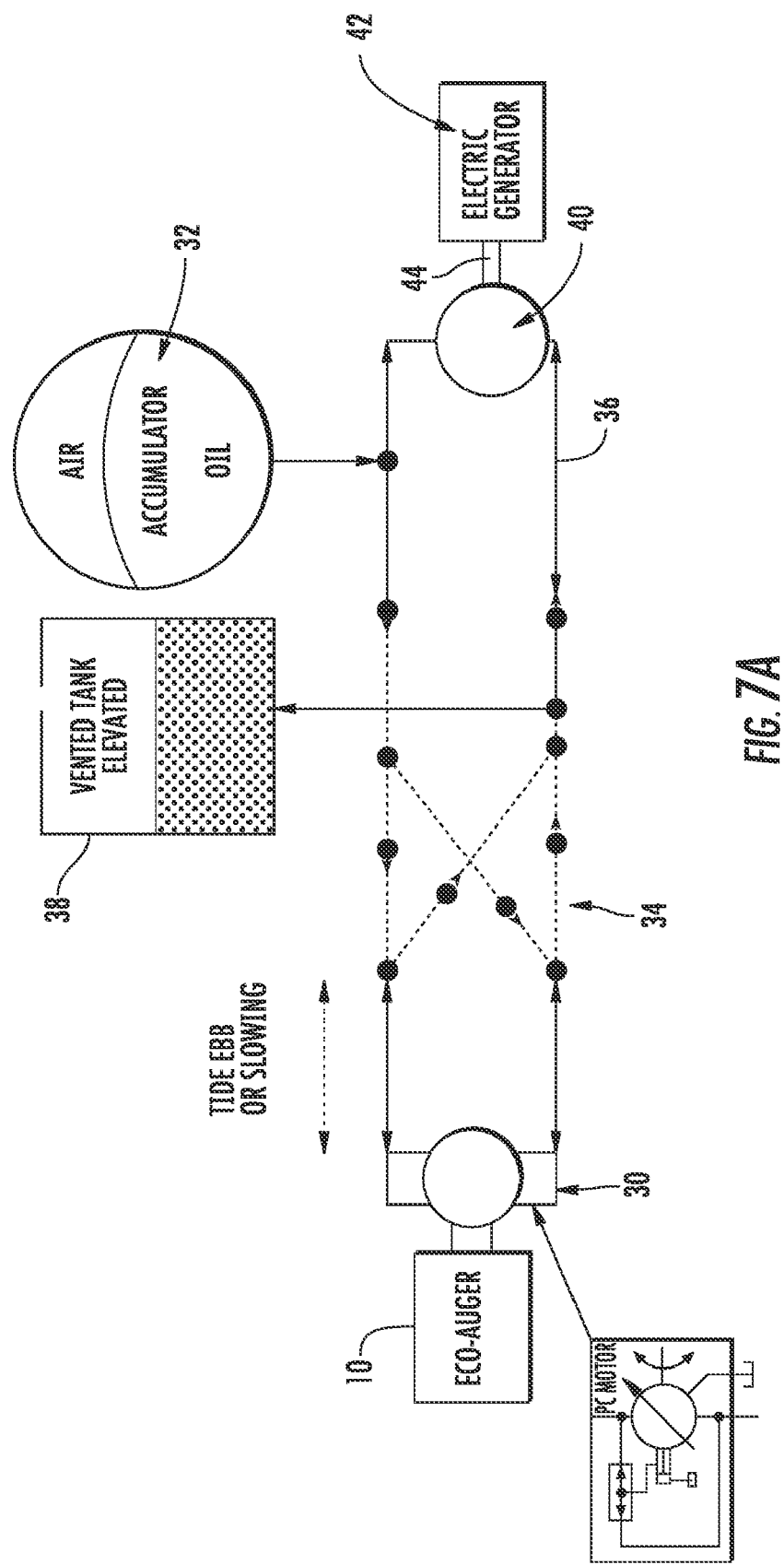

TAPERED HELICAL AUGER TURBINE TO CONVERT HYDROKINETIC ENERGY INTO ELECTRICAL ENERGY

CROSS-REFERENCE TO RELATED APPLICATION

This patent application is a divisional of U.S. patent application Ser. No. 12/400,617, filed Mar. 9, 2009, which claims the benefit of U.S. Provisional Patent Application No. 61/116,540, filed Nov. 20, 2008, the entirety of which is incorporated by reference.

FIELD OF THE INVENTION

The present application relates to a hydrokinetic energy converter, and particularly to a tapered helical auger turbine that can be coupled by hydraulic circuits to a generator to produce electricity from flowing water.

BACKGROUND

Many proposals have been made for generating electricity from tidal and other water flows, using hydrokinetic energy generation. A Policy Statement issued on Nov. 30, 2007 by the Federal Energy Regulatory Commission stated that "[e]stimates suggest that new hydrokinetic technologies, if fully developed, could double the amount of hydropower production in the United States, bringing it from just under 10 percent to close to 20 percent of the national electric energy supply. Given the potential benefits of this new, clean power source, the Commission has taken steps to lower the regulatory barriers to its development." (FERC Policy Statement No. PL08-1-000). Initial proposals for hydrokinetic generation used turbine blades that were able to rotate under pressure from the flow of water. However, such systems were often only able to operate when the water was flowing in one direction. Even if energy could be generated from a tidal flow in both directions of flow, other significant issues arise because peak power flow is only available from a tidal flow at roughly 12-hour intervals. This can cause issues with maximum grid capacities needed to transmit the generated power. Storage devices to smooth out dispatch of power are desirable, but land requirements for the huge batteries, dual reservoir requirements for hydro storage and low efficiency of fuel cells have made known storage devices too expensive to be effective. Thus, known hydrokinetic devices have not been economically viable.

Generally, four types of hydrokinetic devices have been tested in recent years. These are: horizontal axis turbines, vertical axis turbines, oscillating hydrofoils and a Venturi system where water is accelerated through a "choke system" to create a pressure drop that can be used to drive turbines. One example of a vertical helical turbine generator is known from U.S. Pat. No. 6,036,443 to Gorlov. Gorlov discloses a vertically oriented helical turbine which includes helical airfoil-shaped blades that are arranged in a spiral about a central shaft. The helical arrangement allows the turbine generator to be used in multidirectional fluid flows. An array of the turbines can be provided to increase power output. U.S. Pat. No. 4,384,212 to Lapeyre discloses a horizontally mounted helical turbine that is used on the surface to translate surface wave energy into electrical energy. Another surface mounted helical generator is disclosed in U.S. Pat. No. 2,154,397 to Cook.

Significant issues are also caused by known devices to marine life, which can be harmed by the rotating turbine blades. Various proposals to reduce the damage to marine life includes encasing the turbine blades in a wire mesh cage, which adds to the expense of the installation and only act to protect larger animals such as turtles from coming into contact with the blades. However, the cages do nothing to prevent smaller fish from being harmed. Additionally, many proposed turbine blades can suffer damage from water-borne debris, and even shipping. Due to these problems, acceptance of hydrokinetic devices by local communities and environmentally aware groups has not been as strong as hoped for, and the reliability of the devices has been limited Most previous hydrokinetic generation proposals additionally involve providing a rigid housing or anchoring system to retain the generator. This can be prohibitively expensive, as it can involve anchoring installations, and also the installation of energy supply cabling and pipes. Additionally, once installed, there is typically not much flexibility to allow the turbines to move with different water flows. Various proposals exist to ameliorate these difficulties, including U.S. Pat. No. 4,849,647 to McKenzie discloses a floating helical turbine which is connected to a tether line by a flexible ball joint. U.S. Pat. No. 4,708,592 to Krolick et al. discloses a non-rigid helicoidal wind turbine that uses a flexible fabric sheet to form the helix, and which can be tethered to existing mast structures using swivel joints.

For the foregoing reasons, none of the suggested hydrokinetic energy devices have been successful in practice. Thus, there remains a need for an hydrokinetic energy generator that is efficient, can work in a variety of water flow situations possibly including an ice/water mix, and which does not harm marine life.

SUMMARY

In accordance with one aspect of the exemplary embodiments, a helical auger turbine is disclosed for use as a hydrokinetic device to capture, store, and steadily release energy to drive remote electrical generators. The auger turbine includes a generally helical turbine blade rotatably mounted on a central shaft, and a flange extending perpendicularly to an edge of the turbine blade. The outside spiral flange captures a larger percentage of the moving fluid energy than a simple blade. At least one turbine blade support connection is included for connecting the central shaft to a support structure. An electrical generator may be powered by the helical auger turbine, either remotely through an intermediary device or directly. The helical auger turbine can operate a high pressure pump connected to a hydraulic accumulator for storing pressurized hydraulic fluid. An electrical generator can be operated from fluid stored in the hydraulic accumulator at times of slow water flow. A plurality of helical auger turbines can be horizontally oriented under water, tethered to legs of an ocean platform such as an oil rig secured to the seabed.

The hydrokinetic renewable energy system/method according to the invention generates electricity with no carbon footprint. It can generate totally clean electricity 24 hours a day, 7 days a week, with no peaks and troughs in the energy supply due to the variations in tidal flow.

The turbine blade support connection can comprise a nose cone which is adapted to maintain the orientation of the helical auger turbine parallel to a fluid flow direction. The turbine can be formed of at least one of rotationally molded plastics and carbon fiber, and may have internal metal reinforcement structures sufficient to withstand the horizontal forces of fast moving water. The flange can extend to both sides of the turbine blade, and may have rounded edges. A width of the spiral flange can be equal to approximately 25% of the diameter of the helical turbine blade, ± approximately 10%.

In some arrangements, a width of the turbine blade is reduced at each end to provide tapered terminal sections. In some arrangements, the tapered terminal sections may be free of the spiral flange, which may itself be tapered at the start or prior to the tapered terminal sections of the turbine blade.

In accordance with another aspect of the exemplary arrangements, a hydrokinetic device includes at least one helical auger turbine having a generally helical turbine blade rotatably mounted on a central shaft, a flange extending perpendicularly to an edge of the turbine blade, and at least one turbine blade support connection for connecting the central shaft to a support structure. A high pressure pump is operated by the at least one helical turbine, the high pressure pump operating on fluid in a hydraulic circuit. A hydraulic accumulator is provided for storing pressurized hydraulic fluid from the high pressure pump, and an electrical generator is operable from the hydraulic circuit.

In certain arrangements, valves can be provided in the hydraulic circuit so that the electrical generator can be operated by stored high pressure fluid from the hydraulic accumulator at times of slow water flow.

In some arrangements, valves can be provided in the hydraulic circuit so that flow of fluid in at least a part of the hydraulic circuit can be reversed when the helical auger turbine is rotated in opposite directions by the reversing water flow.

In some arrangements, the hydraulic circuit can operate a hydraulic piston motor, the hydraulic piston motor being connected to the electrical generator.

The above-described and other features and advantages of the present disclosure will be appreciated and understood by those skilled in the art from the following detailed description, drawings, and appended claims.

DETAILED DESCRIPTION OF THE INVENTION

Figure 1A:
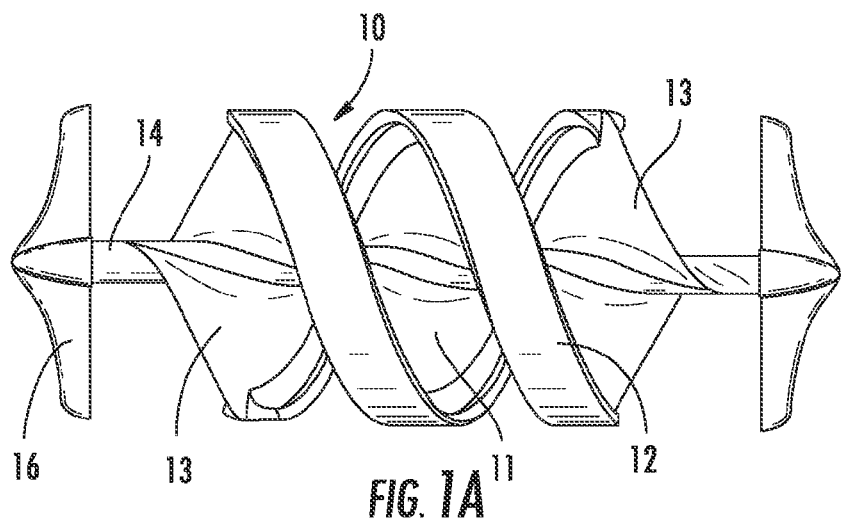
FIGS. 1a, 1b and 1c are top, side and end perspective views of a tapered helical auger turbine according to arrangements of the invention.
Figure 1B:
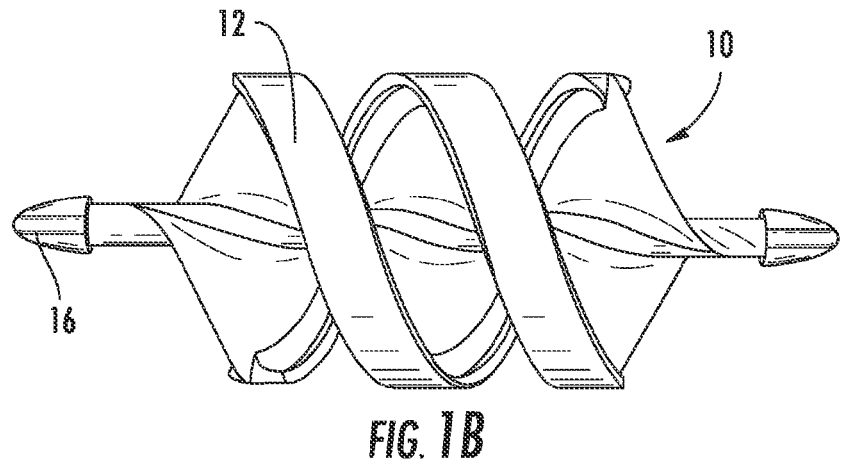
Figure 1C:
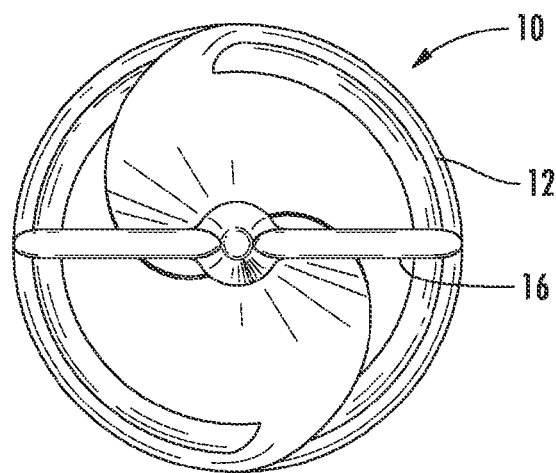
Figure 2:
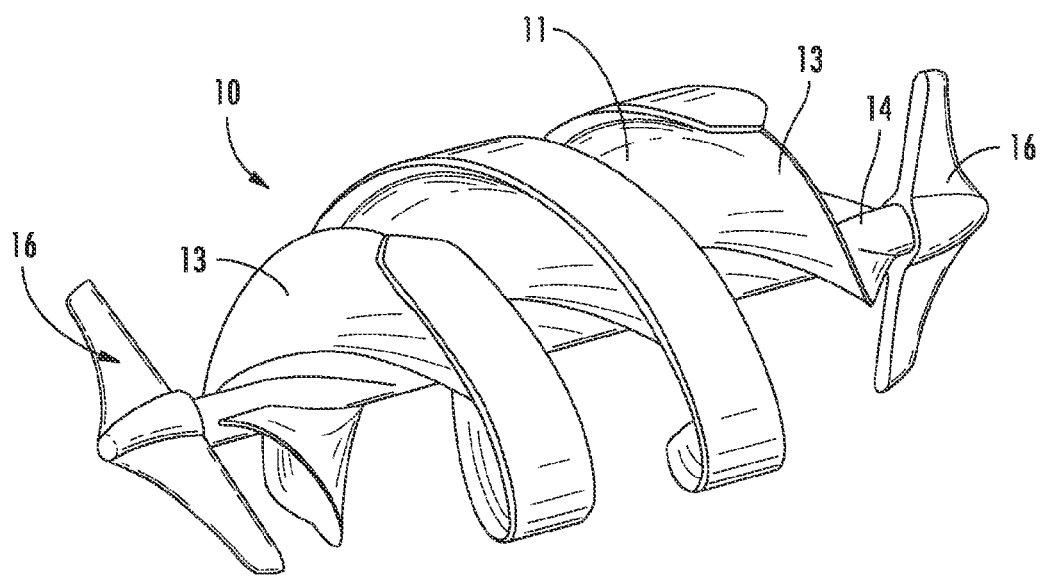
FIG. 2 is a perspective view of a tapered helical auger connected according to arrangements of the invention.
Figure 3A:
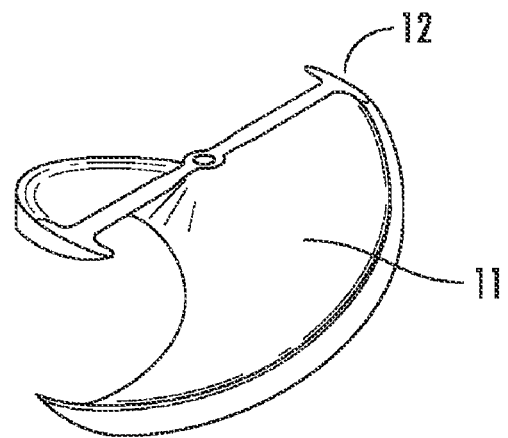
FIGS. 3a and 3b are perspective and end views of center sections of a helical auger according to arrangements of the invention.
Figure 3B:
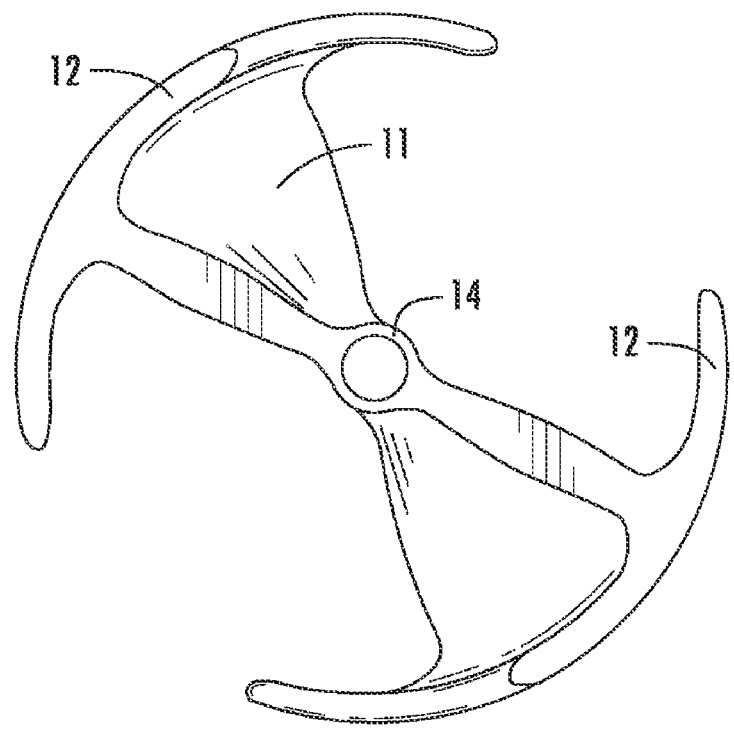
Figure 4:
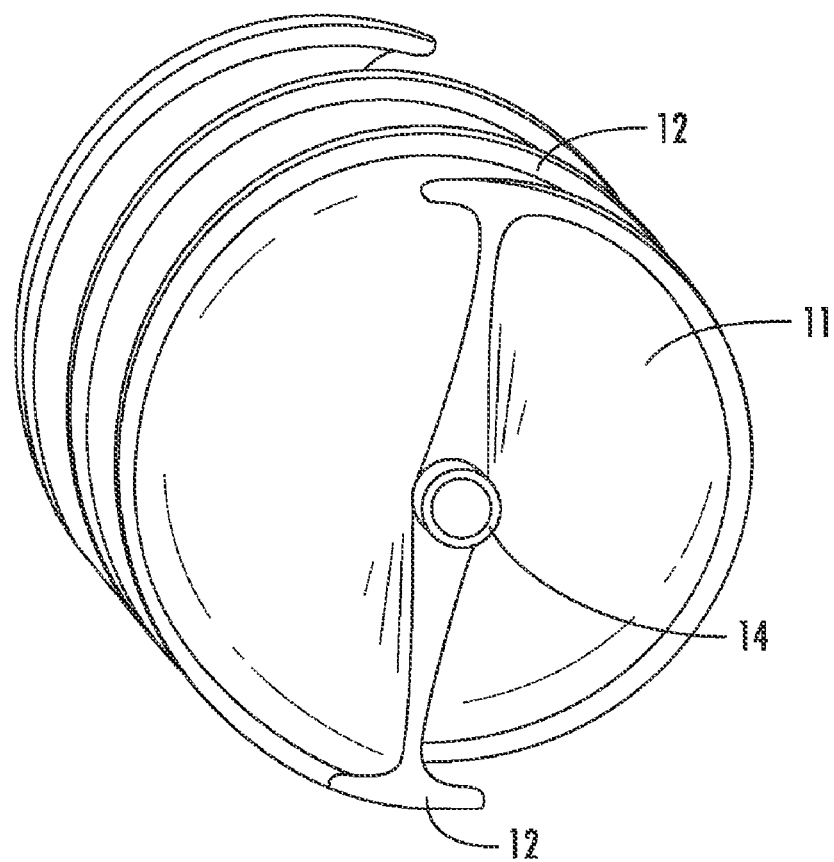
FIG. 4 is an end view of a center section of a helical auger according to arrangements of the invention.
Figure 5:
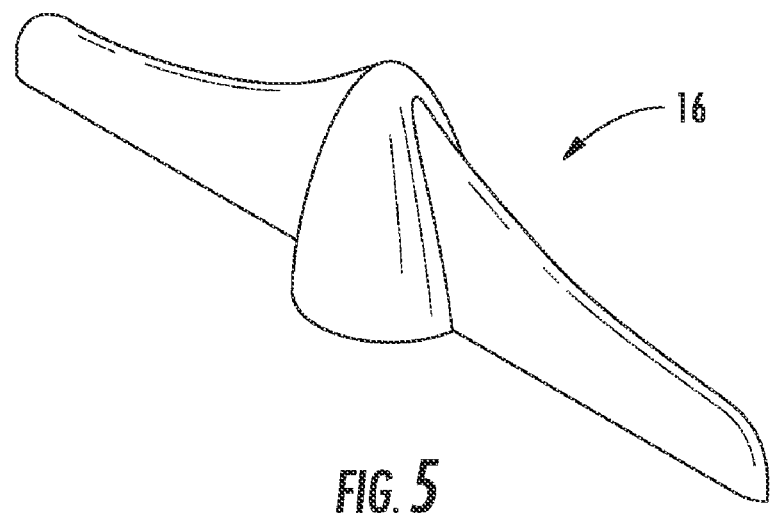
FIG. 5 is a perspective view of a nose cone for connection to a helical auger according to arrangements of the invention.

The exemplary embodiments of the present disclosure are described with respect to a helical auger turbine that can be used in a hydrokinetic energy converter, specifically one that can be used in a tidal flow or river flow. It should be understood by one of ordinary skill in the art that the exemplary embodiments of the present disclosure can be applied to other types of hydrokinetic devices and generators, and even to wind generators.

Referring to the drawings, an exemplary auger turbine 10 is shown. The auger 10 is preferably formed of a lightweight material, such as rotationally molded plastics or molded carbon fiber. It will be appreciated that any suitable material may be used. Reinforcing structures, such as metal ribbing, may be included internally in the turbine blade. In order to aid buoyancy, the auger may be hollow, or can include air pockets or other buoyancy aids. In a preferred arrangement, the helical auger turbine 10 comprises a helical turbine blade 11 provided with a flange 12 at the edge of the blade. The flange 12 is arranged generally perpendicularly to the helical turbine blade 11. In a preferred arrangement, the edges of the flange 12 are smoothly curved, and the turbine blade may also have a gently curved center. In a preferred arrangement, the flange is approximately equal to 25%±10% of the outside diameter of the flange. For example, in an auger 10 that has a 16' diameter, the flange 12 can be 2'-6' in width, preferably 3'-5'.

At each end of the turbine blade 11, a tapered terminal section 13 is provided. In the tapered section 13, the diameter of the turbine blade 11 is gradually and smoothly reduced so that it is tapered into a central shaft 14. No flange is provided at the edge of the tapered terminal section 13, and in a preferred arrangement, ends of the flange 12 leading into the tapered sections 13 are reduced in diameter, to prevent the formation of a sharp edge to the flange that could damage marine life. The tapered sections 13 help to reduce damage to marine life that may come into contact with the auger 10 from either direction, by providing a tapered lead in. A tapered shape is also more tolerant of water-borne or floating debris, and is less likely to suffer damage therefrom. In one exemplary arrangement, the diameter of the turbine blade 11 can be reduced in the tapered sections 13 from, for example, 16' to 4' within 140-180 degrees of rotation of the helix, for example within 165 degrees of rotation.

The helical turbine blade 11 preferably has a 45° pitch, although it will be appreciated that any suitable pitch may be used. The turbine can be supplied in sections of 45° arc or 90° arc that can be assembled together and locked onto the central shaft 14, producing a smooth helical spiral. This permits assembly of the auger 10 on site to suit the intended application and desired size of the energy capturing zone. Typically, a completed auger 10 will have 360° of arc, but of course more or fewer turns of the helix may be used in different applications by adding fewer or more sections.

The auger 10 is designed to rotate relatively slowly with the tidal flow, and the large size and smoothly curved edges allow marine life such as fish to safely move around the blade without becoming trapped or injured. The flange 12 allows the auger to capture water flows coming from various directions to help turn the auger 10 even with a slow flow or if the flow comes from a non-ideal direction.

The central shaft 14 of the auger 10 is hollow, through which an axle shaft can extend. With a 16' diameter auger, the shaft 14 can have a diameter of 18" although of course any suitable size can be employed. The axle shaft can be connected at either end to one or more nose cones 16, and allows the auger 10 to rotate on bearings. The nose cones 16 can be connected by mooring cables 18 to anchors (not shown) that can anchor the auger 10 to the seabed or to joints tethered to an oil rig leg or other securing structure. The nose cones 16 can be provided adjacent to the tapered terminal sections 13 where the diameter of the auger 10 is reduced, in order to prevent pinch points between the auger and nose cone 16.

Figure 6:
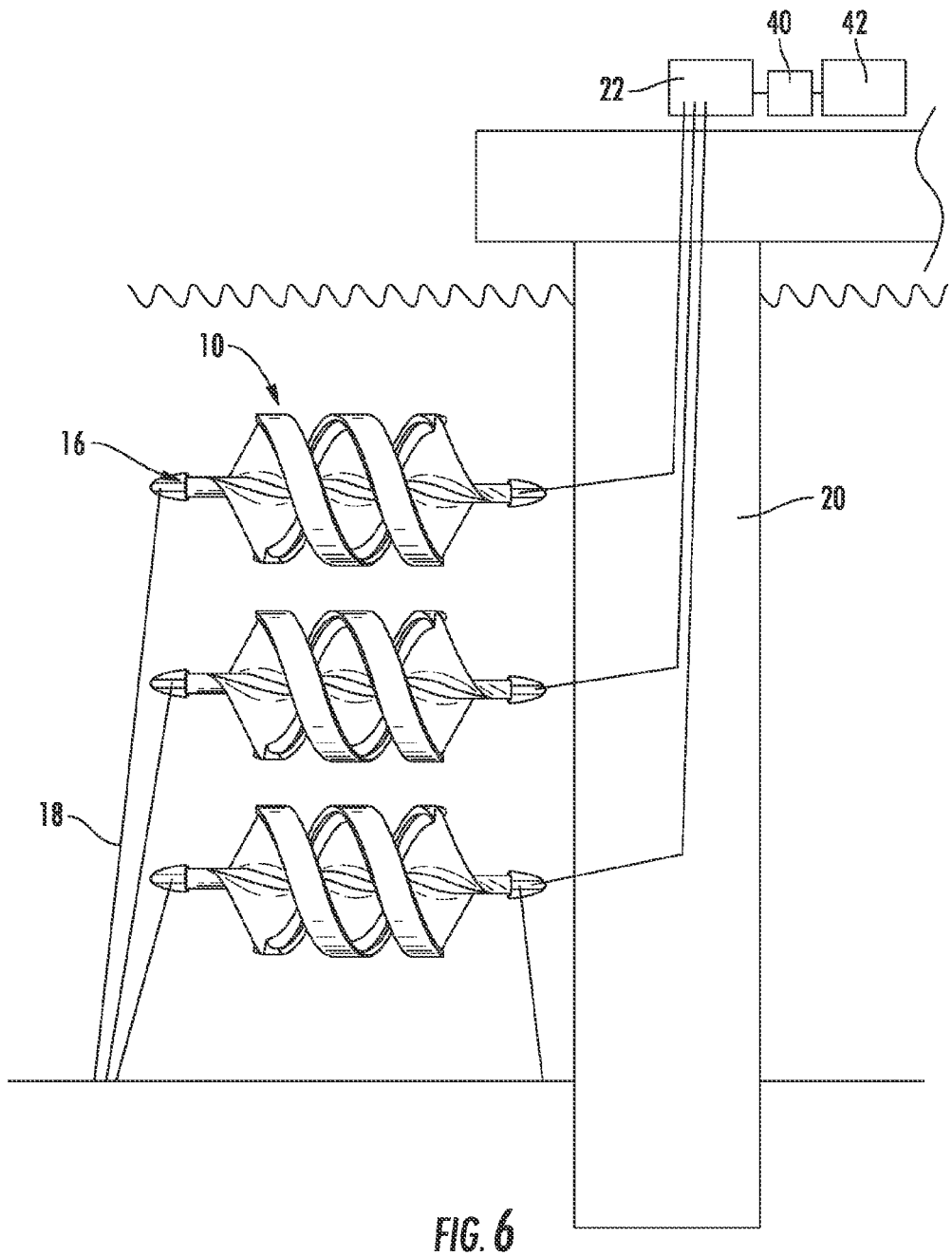
FIG. 6 is a schematic view showing a plurality of tapered helical augers connected to a sea platform having a hydraulically driven electrical generator.

The augers 10 can be anchored in any suitable manner (such as by cables, tether, fasteners, etc.) to any suitable support structure. In one embodiment, the auger can be secured to the legs of an oil rig 20, as shown in FIG. 6. A plurality of augers can be distributed in any suitable manner on the rig 20. The augers can be submerged at a sufficient depth in a body of water so that they are away from floating debris, trees, logs, ice, etc. In some arrangements, the augers 10 can be tethered in place at depths of approximately 8'-10' below the lowest tides, to avoid floating debris. The augers 10 can be oriented generally horizontally, and can be oriented with their central shaft 14 approximately parallel to the tidal or river flow for maximum energy capture. The augers can be adapted to allow for changes in the vertical level of the water in which they are submerged, and can capture tidal flow without horizontal orientation as other tidal generators must do to always be in the same direction with respect to the water flow. To that end, each auger 10 can include horizontal stabilizers with computer controlled ailerons to hold the auger horizontal and parallel to the tidal flow.

The rotation of the augers can be transmitted to power a hydraulic pump, which can generate high pressure oil that can be used for any suitable purpose. The system can be adapted so that water flow in either direction can operate the auger and can store energy in an accumulator, as shown particularly in FIGS. 7-9. During high flow periods, water flow will turn the auger 10. The rotation of the auger can be transmitted to operate the pump, which, in turn, will store hydraulic energy in the accumulator. During low flow periods, the stored energy in the accumulator can be released to continue the steady operation of the electric generator.

The accumulator can function as follows. During water flow, rotation of the augers 10 can be transmitted, such as by gears, to operate a high pressure hydraulic pump such as a stationary pressure compensated variable volume hydraulic motor/pump 30 that can be located in the stationary tethered nose cone assembly 16 with all necessary radial and thrust bearings also housed in the nose cone. In some arrangements, a planetary gearing system 31 can be provided inside the nose cone 16 or another part of the auger 10 to increase the relatively low speed of revolutions per minute of the auger 10 to a level of RPM that can be efficiently used to power the pump 30. The pump 30 can be in fluid communication with an air-fluid accumulator 32, and can be bi-directional to maintain a constant high pressure of hydraulic oil at all speeds irrespective of whether it is accelerating or decelerating or reversing during the cyclic tidal flow. This can be accomplished by a series of criss-cross check valves 34 on a hydraulic circuit 36.

Figure 7B:
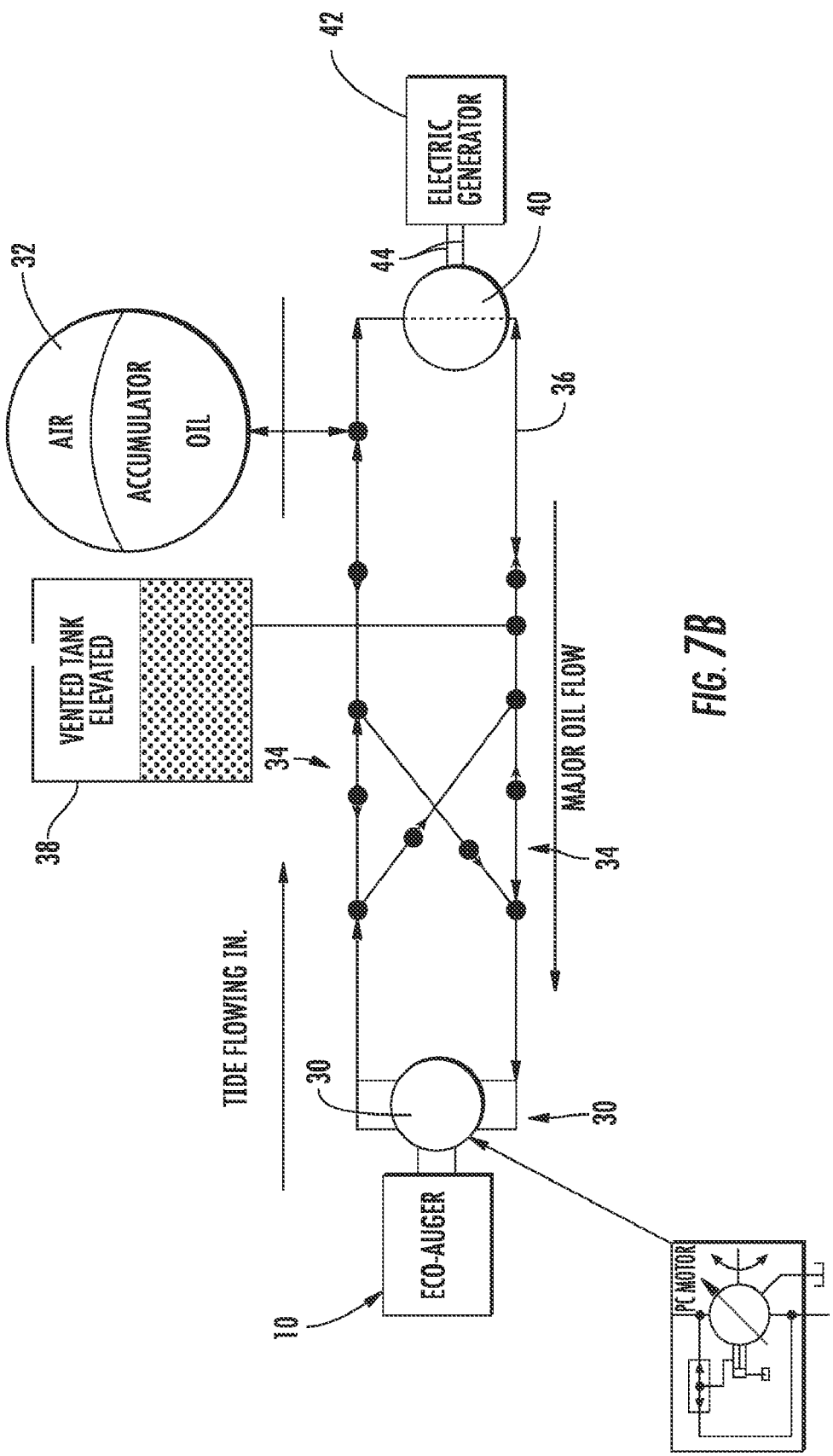
FIG. 7 is a schematic representation of an arrangement of hydraulic circuit for a hydrokinetic system according to arrangements of the invention.
Figure 7C:
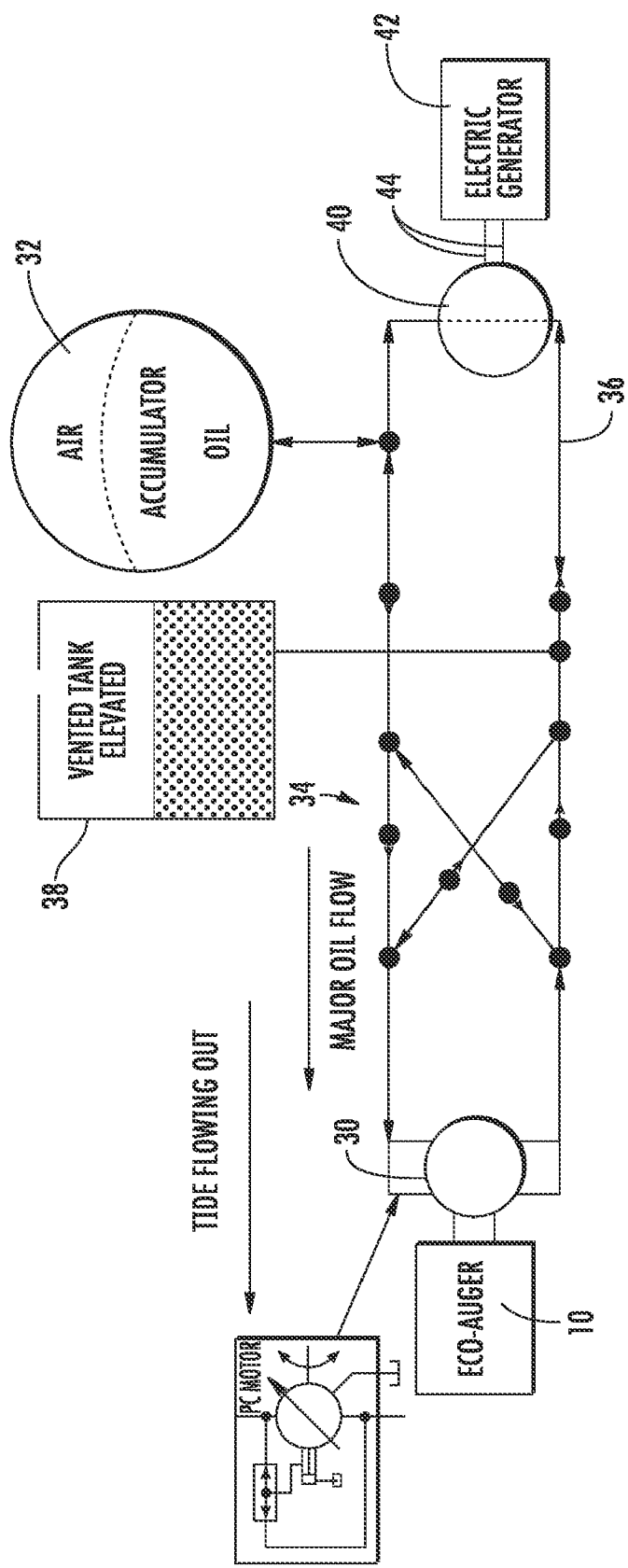

Referring to FIG. 7 in particular, a vented elevated hydraulic fluid storage tank 38 can be supplied to store oil or other hydraulic fluid. It is preferred that all hydraulic fluid is water based and non-flammable so that any leakages in the system due to debris impact will not create a danger or an oil spill. When the tidal flow is ebbing or slowing, the auger 10 is not moving, or is moving too slowly to generate electricity. In this instance, a system controller causes the criss-cross check valves 34 to be closed so that hydraulic fluid flows from the air-fluid accumulator 32 through fixed displacement hydraulic piston motors 40 without flowing through the pump 30. The high pressure in the air-oil accumulator 32 causes fluid to be propelled through the hydraulic circuit 36. The hydraulic piston motors 40 can drive an electric generator 42 via a shaft 44. A suitable hydraulically driven electric generator may be similar to those currently used on emergency vehicles such as fire trucks. During the ebb tide or slower tidal flows, the accumulators 32 release their stored high pressure fluid to drive the electrical generators 42 at their steady output requirements. Fluid then circulates further through the hydraulic circuit 36 to the oil/fluid storage tank 38.

At full or maximum tidal flow, the output volume of the pump 30 can be set larger than the volume of steady flow required by the generator 42. The system controller opens some of the criss-cross valves 34 to open the hydraulic circuit 36 through the pump 30 that is driven by the auger 10, with the hydraulic fluid flowing in one direction. The excess volume of fluid over the generator's flow requirement automatically flows to the air-fluid accumulator 32 for energy storage, and builds up the pressure inside the accumulator 32. Hydraulic fluid may be released from the storage tank 38 via a one-way valve, to ensure that a sufficient volume of fluid is always present in the circuit 36. Multiple accumulators 32 of various sizes can be connected in parallel, enabling adequate energy storage. When the tide has reversed direction, going through the ebb flow valve arrangement, the system controller detects when maximum flow is reached again. The criss-cross valves 34 are operated so that the flow in hydraulic circuit 36 through the pump 30 is reversed and can thus be driven by the auger 10 rotating with the reversed tidal flow, while the flow through the hydraulic piston motors 40 remains in the same direction.

Figure 8:
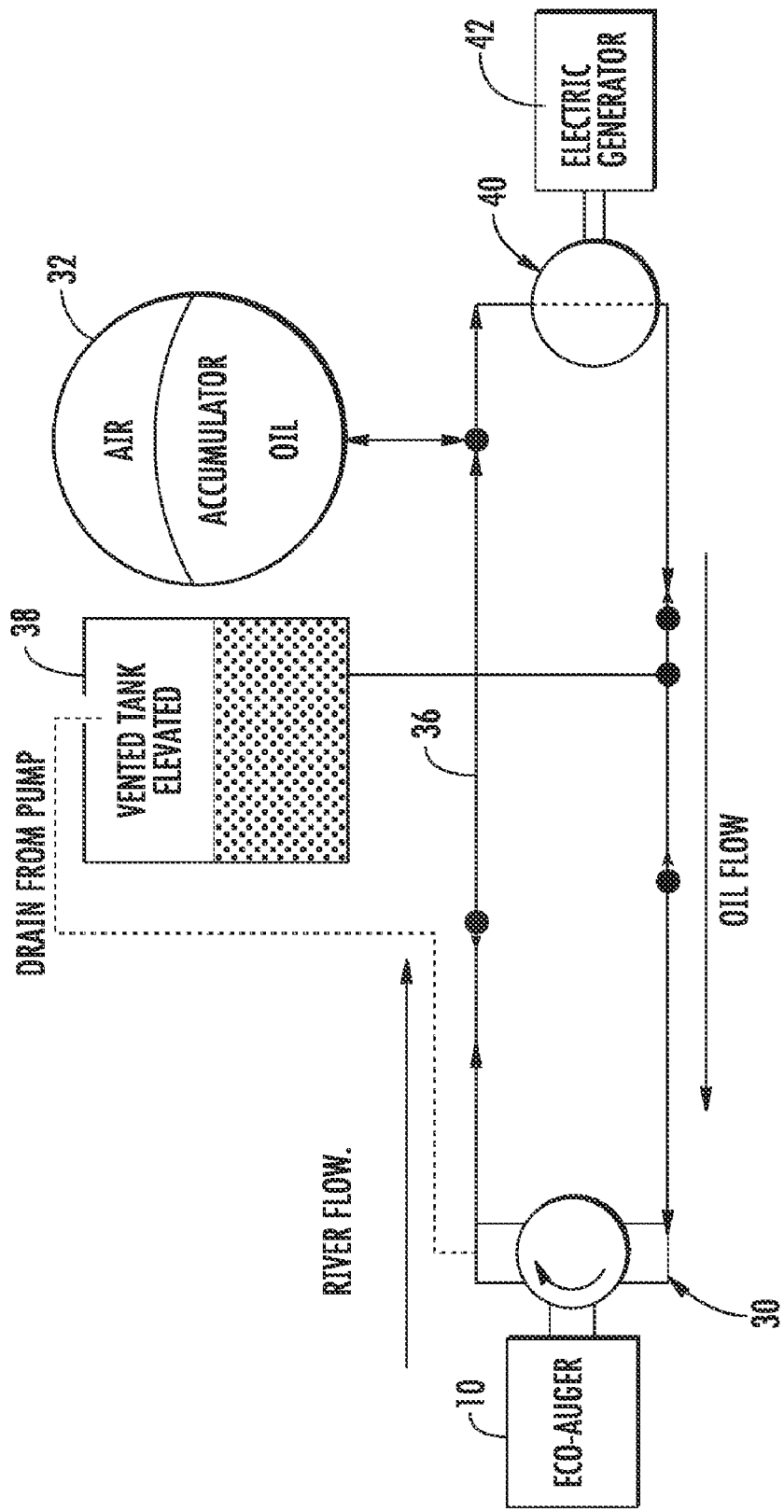
FIG. 8 is a schematic representation of another arrangement of hydraulic circuits for a hydrokinetic system according to arrangements of the invention.
Figure 9:
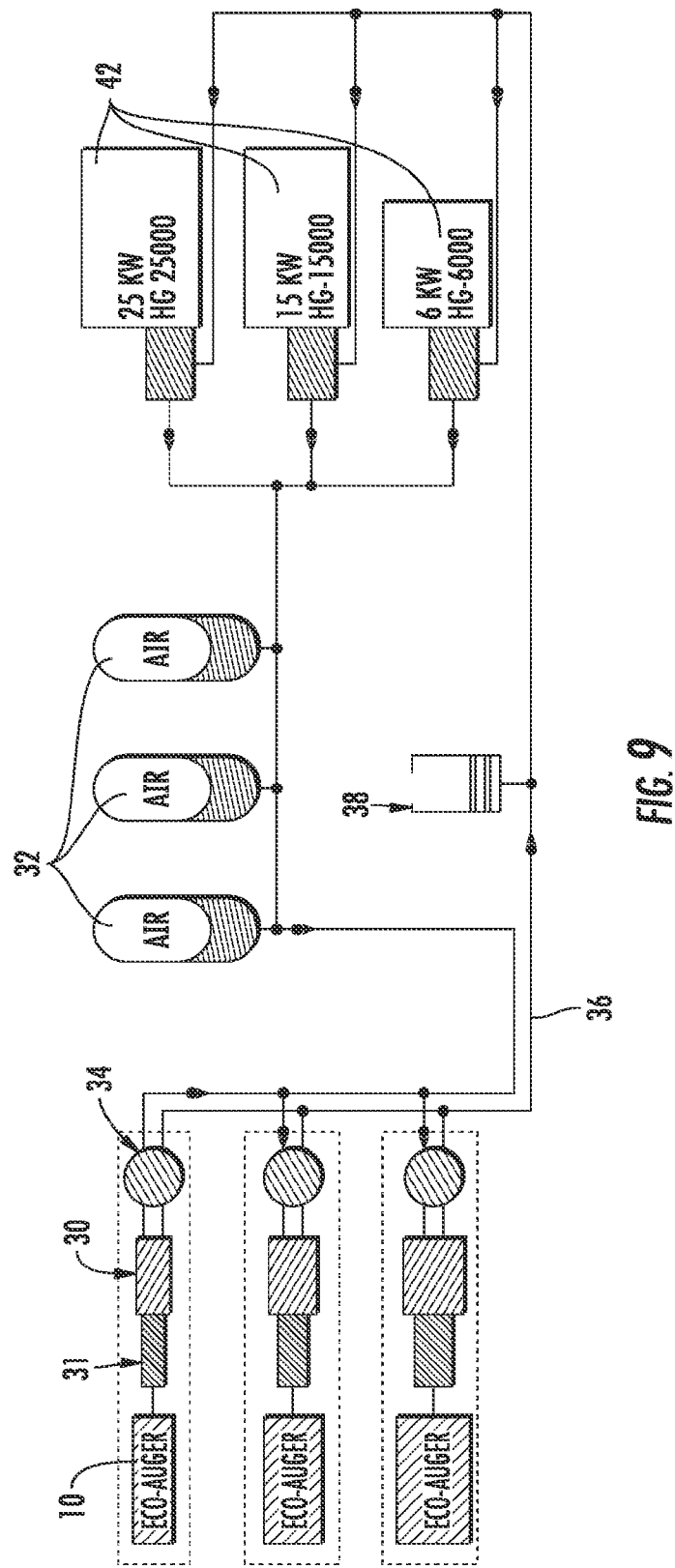
FIG. 9 is a schematic representation of a hydrokinetic system according to arrangements of the invention.

In river locations, as illustrated in FIG. 8 in particular, the pump 30 can be mono-directional and can pump consistent and constant pressure hydraulic fluid in one direction only to the accumulators 32. In river applications, therefore, criss-cross check valves 34 are not required.

Each location thus requires a study to determine the maximum and minimum tidal flow at peak tidal motion, or the size of the river current, in order that the appropriate number, arrangement and sizes of accumulators are used. A computer system can control the accumulators and generators to provide the greatest efficiency in energy generation.

In an exemplary arrangement, in the Cook Inlet, in Alaska, the tides are have a mean diurnal range of 15-28 feet and change every six hours. A 16 ft diameter auger of carbon fiber material can be submerged into the flow below the ice pack which forms in the winter. The augers 10 can be attached to oil platforms in the inlet. Most platforms have 3 or 4 legs, and thus if 4 augers are attached to each leg this enables 12-16 augers to be run simultaneously. The auger 10 can turn on a stationary hollow shaft on sealed bearings to turn a gear box and through a planetary gear system, similar gearing that drives the propeller at the speed of a jet prop airplane engine. This can turn a high pressure hydraulic pump. During the maximum flow periods of four to five hours, this system can pressure up the air-oil accumulator 22. As the flow slows for roughly one hour, the pressured storage of hydraulic oil can continue to turn the hydraulic turbine electric generator. The system is bi-directional, accomplished with crisscross check valves, so that power is stored to the accumulator 22 in either water flow direction. The system can be cable tethered parallel to the tidal flow for maximum energy capture. In deeper water, it is possible to attach a number of the units 10 around the platform 20, arranged up each of the platform legs, evenly staked vertically one over the other.

The gear-driven hydraulic pumps can be located in the nose cone 16 closest to the platform 20. The oil lines are tethered to the platform legs and extend up to the accumulator 22 on the upper platform deck. This will protect them from damage by debris, because the units can be tethered a minimum of 10-15 ft under the surface of the water. Actual electricity generation can be up on the platform 20, out of the ocean water. The tethering system allows for a vertical water level change with the tide. The horizontal stabilizers can have computer control ailerons similar to airplane wings to hold the augers horizontally, and parallel to the tidal flow.

In other arrangements, the augers 10 can be placed on bridge pilings that are either positioned in tidal flow areas or in rivers. In other arrangements, the augers 10 can be used on decommissioned oil rigs to provide power generation that can be transmitted onshore via cables. This can prolong the useful life of oil platforms even after drilling is no longer economically feasible. In yet further arrangements, floating pontoon bridges can be used to tether the augers 10. Each installation (bridge, oil platform, pontoon bridge, etc) can in addition have one or more wind generators mounted above the water to provide additional generation capacity to the installation.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A hydrokinetic device comprising:
   at least one helical auger turbine having
      a generally helical turbine blade rotatably mounted on a central shaft,
      a flange extending perpendicularly to an edge of the turbine blade, and
      at least one turbine blade support connection for connecting the central shaft to a support structure;
   a high pressure pump operated by the at least one helical turbine, the high pressure pump operating on fluid in a hydraulic circuit;
   a hydraulic accumulator for storing pressurized hydraulic fluid from the high pressure pump; and
   an electrical generator operable from the hydraulic circuit.

2. The hydrokinetic device according to claim 1, wherein the turbine blade support connection comprises a nose cone, the nose cone adapted to maintain the orientation of the helical auger turbine parallel to a fluid flow direction.

3. The hydrokinetic device according to claim 1, wherein the turbine is formed of at least one of rotationally molded plastics and carbon fiber.

4. The hydrokinetic device according to claim 3, further comprising internal metal reinforcement structures.

5. The hydrokinetic device according to claim 1, wherein the flange extends to both sides of the turbine blade.

6. The hydrokinetic device according to claim 1, wherein the flange has rounded edges.

7. The hydrokinetic device according to claim 1, wherein a width of the flange is equal to approximately 25% of the diameter of the helical turbine blade, ± approximately 10%.

8. The hydrokinetic device according to claim 1, wherein a width of the turbine blade is reduced at each end to provide tapered terminal sections.

9. The hydrokinetic device according to claim 1, wherein the flange does not extend over the tapered terminal sections.

10. The hydrokinetic device according to claim 1, wherein valves are provided in the hydraulic circuit so that the electrical generator can be operated by stored pressurized fluid from the hydraulic accumulator at times of slow water flow.

11. The hydrokinetic device according to claim 1, wherein valves are provided in the hydraulic circuit so that flow of fluid in at least a part of the hydraulic circuit can be reversed when the helical auger turbine is rotated in an opposite direction by reversed water flow.

12. The hydrokinetic device according to claim 1, wherein the hydraulic circuit operates a hydraulic piston motor, the hydraulic piston motor being connected to the electrical generator.

13. The hydrokinetic device according to claim 1, wherein a plurality of helical auger turbines are provided under water, tethered to legs of an ocean platform secured to the seabed, and wherein the high pressure pump, the hydraulic accumulator and the electrical generator are all provided on the platform, out of the water.

* * * * *